INVENTORS.
LEWIS BALAMUTH
TULIO PARISI

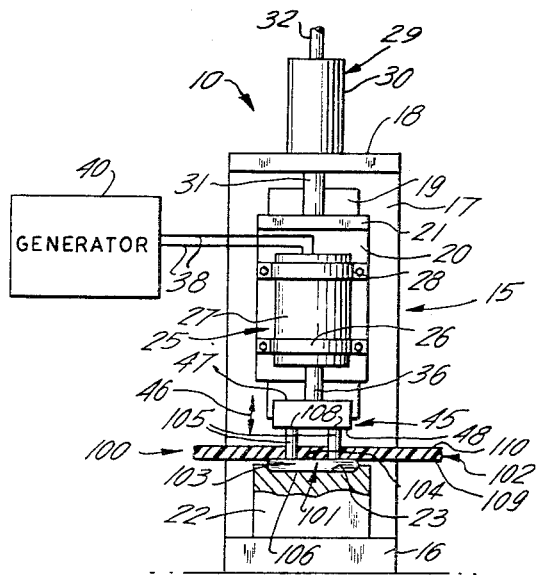

BY

Leonard W. Suroff
ATTORNEY

United States Patent Office 3,483,611
Patented Dec. 16, 1969

3,483,611
METHODS AND APPARATUS FOR ASSEMBLING PARTS TOGETHER BY ULTRASONIC ENERGY
Lewis Balamuth, New York, and Tulio Parisi, Selden, N.Y., assignors to Cavitron Corporation, Long Island City, N.Y., a corporation of New York
Filed Aug. 12, 1966, Ser. No. 572,147
Int. Cl. B21d 39/00; B23p 11/00
U.S. Cl. 29—509                        10 Claims

ABSTRACT OF THE DISCLOSURE

A method and apparatus for the assembling of a rivet-like member to a second member having an aperture therein designed to receive the extended portion of the rivet-like member. A static force is applied to the two members while high frequency vibrations are simultaneously applied causing said extended portion to soften.

---

This invention relates generally to an improved method and apparatus for assembling component parts together and more particularly, it is directed to heading or staking assembly operations, or the like, employing high frequency, preferably ultrasonic vibrational energy.

In the assembly of component parts, there are applications in which it is desirable to permanently secure together parts of various shapes and sizes and in one known technique one of the assembled parts is headed or staked over to join them together. The parts joined may be comprised of various materials, and combinations thereof, for example metal to metal, plastic to plastic, plastic to metal, metal to glass, etc.

Heretofore, these heading or staking operations have generally been performed by the application of large static forces to obtain a flow of displaced material at room temperature, or a heat source has been applied with a static force to the extended portion to be headed over to obtain the desired material displacement.

In the assembly of component parts in which heading operations are employed generally one part is machined or moulded with one or more extended portions in the form of prongs or tabs extending therefrom and a second part is adapted to have the prongs extend therethrough, as by providing a series of apertures or slots which coincide with the prongs of the first part. The parts are placed in overlapping relationship to each other with the prongs extending through and beyond the opposite side of the second part. In this position, a static force is applied to the extended prong or prongs to head it over. For certain applications the energy source is in the form of heat in combination with a static force, the heat causes the extended prong to soften and under the static force, it is compressed into a desired shape.

The applicants have found that the prior art heading or staking assembly procedures do not provide sufficient versatility and materially affect the assembled parts, for example if the parts from a container, then the contents of the container might be injured by the shock of the large static forces or the heat when combined with the static forces that have to be employed. Thus, in the packaging of certain electrical goods or assembling of delicate or brittle parts, it has been found that in order to head over a plastic or metal rivet the static forces for certain applications would be too great and that a cracking or crazing of the resultant component parts would occur. For other applications, the use of heat which would have to be applied to the extended rivet portion, would also be detrimental in that the heat would be transmitted to the remaining portions of the packaged material.

The prior art method is further unsatisfactory when it is desired to employ a heated tool to perform the heading operation on plastic materials. The heat cannot always be accurately controlled with the result that the plastic part being headed over may severely burn and be permanently charred so as to produce an unacceptable commercial assembly.

The prior art method in which large static forces are required greatly hampers the configuration of the parts being assembled in that the body of the part from which the prong extends must be of a sufficiently rigid construction to withstand the large static forces that must be applied to head over the prong at room temperatures.

The applicants herein have discovered that it is possible to employ high frequency vibratory energy to perform heading operations for joining component parts without the shortcomings of prior art techniques.

The primary object of the present invention is to provide improved methods and apparatus for the joining of component parts.

A further object of the present invention is to provide a method to stake over materials at greatly reduced static forces, through the use of high frequency vibrations.

Another object of the present invention is to provide improved methods and apparatus to stake a variety of fastening elements at pressures and temperatures much reduced as compared with present techniques.

Still another object of the present invention is to provide improved methods and apparatus to form a headed element having a contoured configuration adapted to be permanently assembled to a component part.

It has been established in the prior art that high frequency mechanical vibrations do, in fact, soften both metals and plastics. The softening effect in plastics and other materials is described and used in U.S. Patent No. 3,184,353, issued May 18, 1965 and assigned to the assignee of the present invention and in which one of the present applicants is co-inventor thereof. In the case of metals, the pioneering work of Langenecker, as discussed in the report of B. Langenecker et al., entiled "Effects of Ultrasound on Deformation Characteristics of Structural Metals," U.S. Naval Ordinance Test Station, China Lake, Calif. 8482, March 1964, has shown that metals ranging from aluminum to tungsten and including steel and copper, may be rendered plastic by the introduction of ultrasonic vibratory energy alone.

One of the applicants of the present invention has appreciated and pioneered in this work and has enumerated as a general principle what may be called the principle of "thermal equivalance." This principle asserts that when a phenomenon is produced primarily by the use of high temperature and heat transfer, then the same phenomenon may be produced by the use of high frequency mechanical vibrations applied at reduced temperatures. This principle has found many uses in ultrasonics, including metal and plastic welding and joining procedures.

Moreover, the applicants have now discovered that the principles of accoustically softening materials with high frequency mechanical vibrations may be employed in a new and novel way to obtain the assembly of parts as by heading or staking them together in accordance with the present invention, and hereinafter described in greater detail.

In accordance with an aspect of the present invention, a first component part is generally provided with an extended portion which may take the form of one or more prongs or tabs that extend from a surface thereof and are adapted to extend through and beyond the opposite surface of a second component part. The extended portion is inserted through the second part in which a clearance aperture is generally provided. The first component part is supported on a support or back-up member so that the parts are maintained in overlapping relationship to each other. High frequency mechanical vibrations are then transmitted to the first part, generally directly to the prong, a a predetermined frequency of vibration, which is preferably approximately in the range of 1 kc./sec. and 100 kc./sec., so as to transmit compressional waves to the pronged portion to effect a softening thereof. Simultaneously, with the high frequency mechanical vibrations being applied, generally from a vibrator assembly, the support member and vibrator assembly are urged towards each other to compress the softened prong. In this manner, the prong is headed over to join the parts together. Preferably, the desired configuration of the headed prong is of a diameter or shape having a larger cross-sectional area than the aperture in the second part through which it extends. In this manner, when the heading or staking operation is completed, the first and second member will be securely joined together.

In the case of home consumer items, such as plastic spectacle frames, plastic model kits and the like, the objects are not large and the prongs to be headed over are small, so that the vibration tool may be so simplified and miniaturized as to be very inexpensive and thus attractive for use by hobbyists and the like.

Thus, the method disclosed herein may be employed in the assembling of a plastic car, boat, train or other models of the type that have found acceptance with the public. When such models are assembled with glue or adhesive, care must be taken to avoid smearing or flow of excess glue which results in the marring of the visible surface of this model. In addition to the "sloppy" appearance that results, there is the deleterious odor associated with almost all commercially available glues for use with plastics at the present time. By the use of a vibratory tool to assemble plastic models in accordance with this invention, it is possible to avoid the foregoing disadvantage and a clean, neat, assembled model is easily obtainable. Since the vibrated tool remains at room temperature when not in contact with the plastic, it avoids the fire hazards associated with the use of heated tools, for example, soldering irons, for melting and joining plastics.

The term "ultrasonic" as used herein is intended to include acoustic vibrations, for example, at a frequency in the range between approximately 1 kc./sec. and 100 kc./sec. The operating frequency may be in the higher sonic or ultrasonic ranges, preferably in the range between approximately 15 kc./sec. and 30 kc./sec.

The above, and other objects, features and advantages of the invention, will be apparent in the following detailed description of illustrative embodiments thereof which is to be read in connection with the accompanying drawings forming a part hereof and wherein:

FIG. 1 is a front view of an ultrasonic apparatus according to the invention for heading or staking a component part, according to the method of invention;

FIG. 2 is a side view, partly in section, of the ultrasonic heading apparatus in FIG. 1;

FIG. 3 is an enlarged sectional view corresponding to a portion of FIG. 1, viewed after the heading operation has been performed;

FIG. 4 is a view taken along line 4—4 on FIG. 3;

FIGS. 5 and 6 are fragmentary views, partly in section, showing the heading operation wherein the vibratory energy is transmitted to one of the parts of the assembly at an area remote from the extended portion in accordance with the present invention;

Similar reference characters refer to similar parts throughout the several views of the drawings and specification.

Figure 7:
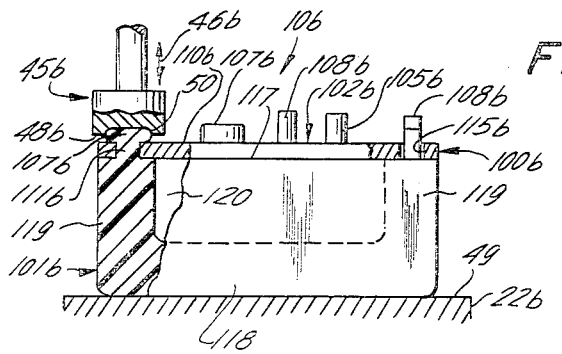
FIG. 7 illustrates another feature of the present invention wherein the extended portion is formed with a contoured configuration.

Referring to the drawings in detail and initially to FIGS. 1, 2, 3, and 4 thereof, there is illustrated apparatus 10 for ultrasonically staking component parts together, it will be seen that, the parts to be joined may be of any thermoplastic or thermosoftening material or materials.

In FIGS. 1, 2, 3 and 4, there is illustrated the process in accordance with the present invention of forming a component assembly 100 having a first part 101, which may be moulded, cast, or machined out of for example a plastic material and joined to a second part 102, which may be in sheet form. The first part 101 may be of any number of configurations or designs and serve as an emblem, decal, name plate, button, etc. that has to be assembled with a second part and the two being permanently joined together. The first part 101 is seen having a circular body portion 103 (FIG. 4) with an extended portion protruding in a plane substantially normal to the lower surface or back 104 in the form of a pair of spaced-apart prongs 105. The upper surface or front 106 of the body portion 103 being flat and adapted to be supported during the heading operation. For example, the first part may be in the form of a button which has to be secured to a synthetic fabric such as nylon.

The second part 102 may be of either a plastic, metal or synthetic material, etc. for which it is desired to permanently join the first part 101. The prongs 105 are inserted through the second part 102 depending on the thickness and material of the second part they may be merely forced through to pierce the second part or receiving apertures may be provided. In either case the lower surface 109 of the second part 102 is in overlapping relationship to the back 104 of the body 103 and the prongs 105 extend through the second part and beyond the upper surface 110 thereof. The diameter and length of the prongs will vary in accordance with the desired strength of the final assembly, as well as the diameter of the headed portion required. The mechanical vibrations for effecting the softening action of the extended prongs are preferably applied through a high frequency vibratory tool of suitable configuration which is vibrated longitudinally. The vibratory tool may be mounted at one end of any suitable electro-mechanical transducer capable of vibrating the tool in a frequency within the range between 1 kc./sec. and 100 kc./sec. and an amplitude within a range of .0001 to 0.25 inch so as to provide peak accelerations.

The apparatus for carrying out the methods of the present invention may include a vibrator support assembly in the form of a support stand 15 that is provided for maintaining the vibrator assembly 25 in proper position, and may include a base 16 with an upright wall 17 extending upwardly from one end of said base and a head 18 extending from the upright wall 17 and in overlaping relationship to the base 16. Mounted on the upright wall 17 is a mounting channel 19 which engages a support block 20 which is slidably connected by a dovetail connection (not shown) to the mounting member 19 to permit vertical movement of the vibrator assembly 25 between the base 16 and head 18 of the support stand 15. The vibrator assembly 25 is suitably secured to the support block 20, for example, by means of bands 26 which encompass the casing 27 of the vibrator assembly and are secured to the support block 20 by means of bolts 28. A support member or mounting fixture 22 of any suitable type for holding the first part 101 is provided on the base 16 and has a recess 23 therein for receiving component part.

Drive means 29 to effect vertical movement of the vibrator assembly 25 toward and away from the support member 22 is provided and may be in the form of a cylinder 30 vertically mounted to the head 18 and having a shaft 31 extending therefrom and through the head 18 and coupled to a horizontal flange 21 of the support block 20 in any conventional manner. The air cylinder 30 may be operated by supplying compressed air conveyed by conduit 32 from an exterior source (not shown) and extended from the rear of the cylinder. The exact height of adjustment or stroke of the shaft 30 is generally determined prior to the commencement of the heading operation.

The mechanical vibrator assembly 25 includes a transducer (not shown) which may be any one of a number of eelctromechanical types, such as, electro-dynamic, piezo-electric or magnetostrictive. The operating frequency may be in the sonic or ultrasonic range between approximately 1 kc./sec. to 100 kc./sec. but preferably in the range from 15 kc./sec. to 30 kc./sec. The vibrator assembly 25 is preferably of the type generally disclosed in the United States Letters Patent No. 25,033 issued Aug. 29, 1961. The transducer (not shown) housed within the casing 27 may be cooled as by water or air.

The vibrator assembly 25, generally includes a driver unit made up of a transducer secured to an acousitc impedance transformer of connecting body 36 that extends from the casing 27. The transducer of mechanical vibrations may comprise a stack of laminations of magnetostrictive material, for example, nickel, and surrounded by a coil winding (not shown) adapted to carry a biased, high frequency alternating energizing current. The lower ends of the laminations making up the stack of the transducer are fixedly secured, as by welding or soldering, to the upper end of the transformer 36. The transformer 36 has an enlarged section (not shown) in the general area of a nodal plane of motion, and this section constitutes a flange secured to the casing 27.

A biased, high frequency alternating current is supplied to the winding through conductors 38 extending from a suitable oscillation generator 40, which may be of the type disclosed at page 270 of Ultrasonic Engineering, by Alan B. Crawford, published 1955 by Butterworth Scientific Publications, London. An oscillation generator of this type is effective to supply a biased alternating current to the winding at a resonant frequency of the driver unit of the transducer and is further effective to vary the frequency of the driver unit due to changes in temperature, or changes in the loading thereof. Although the frequency of the supplied biased, alternating current is adjusted, in the oscillation generator disclosed in the above identified publication, in response to a feedback signal from a capacitor type pick-up connected to the transducer, it is to be understood that other types of pick-ups may be employed, for example, as disclosed in United States Letters Patent No. 2,872,578, in which adjustment of the frequency of the alternating current supplied by the oscillation generator is obtained through the use of a feedback signal which varies with the impedance of the transducer.

The lower end of the connecting body 36 is coupled to the input end 47 of tool 45 so that when the vibrator assembly 25 is operated, by electrical oscillations supplied from generator 40, compressional waves are generated in the stack of laminations, the connecting body 36 and tool 45, so as to cause vibrational movements in the vertical direction, that is along the longitudinal axis of the transducer. For the purpose of the present invention, such vibrations preferably have a frequency in the range between approximately 1 kc./sec. and 100 kc./sec., and are of sizable amplitude, for example, in the range between approximately .0001 and .025 inch. In order to ensure that the maximum amplitude of vibration in the vertical direction is obtained at the lower end or output surface 48 of the tool 45, as indicated by the double headed arrow 46, thus ensuring the maximum transmission of working acoustical energy, the overall length of the stack of magnetostrictive laminations, the connecting body 36, and the tool 45 is selected so that, at the frequency of the electrical oscillations supplied to winding of the transducer, a loop of longitudinal motion of the generated compressional waves occurs at or near the output surface 48 of the tool 45.

The tool 45 as in FIGS. 1 and 2 is of a metallic material having good acoustical transmission properties so that the vibrations transmitted from the input surface 47 are propagated through the tool to its output surface 48. The coupling between the output end 37 of the vibrator assembly 25 and the tool 45 may be of any conventional form for example as by a threaded coupling (not shown). If the static force applied between the output end 37 of the connecting body 36 and the input surface 47 of the tool 45 is of sufficient magnitude then no mechanical coupling between the two is required.

OPERATION

In assembling the parts 101 and 102 together to form the assembly 100 the prongs 105 are first inserted through part 102 and if no receiving apertures are provided the prongs are pierced through the sheet material until the back 104 of the body portion 103 is in overlapping relationship to and generally in engagement with the lower surface 109 of the second part 102. The parts are then seated within the support member 22 wherein the front 106 of the body portion 103 rests in the recess 23. The tool 45 is then brought into overlapping relationship with the prongs so that the output surface 48 engages the faces 108 of the prongs 105.

The output surface 48 of the tool 45 may have any number of desired configurations so as to head over the prongs 105 into any form or shape. As seen in FIG. 3, which is an enlarged view showing the headed portion 107 formed from the prongs 105, the output surface 48 has a flat surface which will gradually compress the prongs until the headed portion is formed on each one respectively.

The vibratory assembly 25 is vertically adjusted by means of the drive means 29. The cylinder drive 30 is energized and the shaft 31 extending therefrom vertically adjusts the height of the vibrating assembly through its coupling with bracket 20. While in this position, the oscillator generator 40 is energized to supply current so as to induce high frequency mechanical vibrations in the transducer that are transmitted through the connecting body 36 and tool 45 to the output surface 48. These high frequency vibratory motions, which are generally in the range of 1 kc./sec. to 100 kc./sec., are applied in a plane substantially normal to the extended axis of the prong. The vibratory tool 45 is preferably vibrating prior to its engagement with the face 108 of the prong 105. Since more power is initially required in order to bring the tool up to a given amplitude of vibration, even in an unloaded condition, than is required to sustain it at a given amplitude of vibration, it is generally preferable to vibrate the tool prior to its engagement with the prongs. In contrast to this, if the tool is first brought into engagement with the prong under a static force then the power required in a loaded condition to vibrate the tool is substantially increased. The vibratory tool 45 is maintained in energy transferring relationship to the prongs 105 under a static force and is continually urged toward the support member 22. As the energy is transmitted to the interfacial area between tool and prongs a gradual softening of the prongs 105 occur in accordance with the general principle of thermal equivalence and/or acoustically softening of materials, and as this softening of material continues, the vertical movement of the drive means 29 is continued so as to form the headed portions 107 from the extended prongs.

For prongs of plastic materials the interfacial area between the tool and prongs are preferably maintained at a loop of compressional waves in the plane substantially normal to the tool surface. When the material being headed over is of a metallic material or other material requiring additional concentrations of energy at the interfacial area the transducer and tool combination may be designed whereas the output surface is substantially at a node of compressional waves in the plane substantially normal to the output surface in accordance with the teachings fully disclosed in U.S. Letters Patent No. 3,396,892, assigned to the present assignee. The decision of placing the output surface at a loop or nodal region is primarily dependent upon the material the prongs are composed of as well as the volume of material to be staked over. In addition the vibratory energy may be transmitted in a plane substantially perpendicular to the extending axis of the prong 105 or parallel to the horizontal surface 108 thereof.

As seen in FIG. 3 at the completion of the down stroke of the tool 45, the prongs 105 are compressed until the length of the neck portion 111 is substantially equal to the thickness of the second part 102, the diameter and thickness of the headed portions may be predetermined by calculating the volume of material that will be displaced during the heading operation. The drive means 29 may then be reversed to raise the tool 45 to its initial position to permit the removal of the component assembly 100 from the support member 22.

It has been found that for certain assembly procedures it is preferable that the vibratory energy is first transmitted to the body portion of the first part. This is generally the case when the extended portion is in an inaccessible area and difficult to reach. FIGS. 5 and 6 illustrate another embodiment of the invention 10a which is essentially the same as the embodiment illustrated in FIGS. 1 through 4, except that the vibratory energy as seen by arrow 46a is transmitted from the output surface 48a of the tool 45a to the front 106a of the body 103a of the first part 101a. The prong portion 105a is seated in the support member 22a which is provided with a contoured recess 23a which will shape the headed portion as seen in FIG 6 during the heading operation. The first part 101a which may be in the form of a button, or handle to be permanently secured to a second part 102a, is provided with an annular shoulder 114 immediately adjacent to the head portion and from which shoulder the single prong 105a integral therewith extends. The second part may be provided with a preformed aperture 115 which is of slightly larger diameter then the prong portion, as seen in FIG. 5, to facilitate the insertion of the prong portion through the second part 102a.

As seen in FIG. 6, as the die member and support member are moved axially towards each other, the head 107a of the assembly 100a is formed on the side remote from the source of vibratory energy. It has been found that if the first part 101a is of a material having good acoustical transmission properties then the vibratory energy will induce a softening of the material in the area in contact with the support member 22a.

By properly controlling the rate of movement of the tool 45a relative to the support member 22a, the diameter of the neck portion 111a of the assembly 100a may be controlled. This permits one to start with a larger tolerance in the dimensional clearances between the mating parts and upon assembly be assured that the clearance area is entirely filled. The displaced material of the prong portion when formed into the head will generally fully occupy the apertures 115 to form the neck portion 111a therein having a diameter larger than the prong portion 105a prior to its being headed over.

FIG. 7 illustrates another embodiment 10b of the present invention wherein an assembly 100b is comprised of a first part 101b that may be either machined or molded with a plurality of integral prongs 105b extending from the upper surface 117 thereof. For example, the first part 101b may be the lower section of a container having a flat bottom 118 with an annular side wall 119 extending upwardly therefrom to provide a cavity 120 therein for the packaging of material. The first part 101b is supported on the upper surface 49 of the support member 22b.

The second part 102b which acts as a cover is provided with a plurality of apertures 15b which mate with the extended prongs of the first part and through which they extend. The prongs 105b are of sufficient lengths to extend beyond the upper surface 110b of the second part 102b so that they may be headed over to secure the two parts together. As seen in FIG. 7, the second part 102b is illustrated as being fabricated from a metallic material and has an outer periphery which coincides with that of the first part. In performing the heading operation the prongs may be individually headed over or a broad base tool may be employed in which all the prongs are simultaneously headed over. If the former procedure is followed then the parts are generally placed on an indexing table and rotated the proper amount after each heading operation to bring the next prong into axial alignment with the tool. The tool 45b which is coupled to the connecting body of the vibrator assembly is vibrated as indicated by arrow 46b along a plane substantially normal to the extended axis of the prongs. The output surface 48b of the tool is provided with a contoured recess 50 so as to obtain a specific configuration on the head 107b of the staked prong. As the tool is progressively urged against the face 108b of the prong 105b the material softens and will conform to the recess of the tool in accordance with the principles hereinabove explained. A neck portion 111b is formed which is of a diameter that coincides with that of the aperture 115b which was initially provided of an oversized dimension to permit an easy initial assembly of the two parts.

Figure 8:
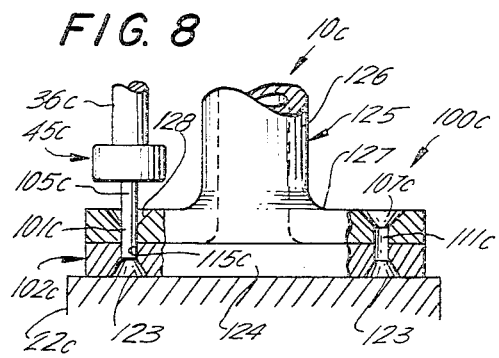
FIG. 8 illustrates another feature of the present invention in which two or more parts may be secured together by a third part that is headed over.

FIG. 8 illustrates another embodiment 10c of the present invention in which it is primarily desired that the headed portion of the assembly 100c be entirely hidden and does not protrude from a surface of one of the assembled parts. In addition the first part may extend through a second part and third part to secure them both together.

In this embodiment of the invention, the first part 101c is illustrated securing together the second part 102c and a third part 125. Essentially the first part 101c acts as a true fastener in that it is not formed as an integral part of one of the other parts being assembled and for example may be in the form of a rivet having a tapered head 123 at one end with a shank or prong 105c extending therefrom. The third part 125 may be in the form of a tubular pipe 126 which merges at one end with an annular flange 127 having a series of apertures 128 partially countersunk therein and coinciding with the corresponding apertures 115c in the second part. The rivet 101c is inserted to extend through the apertures 115c and 128 respectively and beyong the upper surface of the flange. The three parts are then positioned on the support member 22c. The vibrating tool 45c which is coupled to the connecting body 36c is brought into engagement with the rivet shank 105c and gradually urged towards the support member 22c until the shank is formed having a headed portion 107c which is contained within the countersunk portion of the aperture 128. The parts in FIG. 8 are illustrated as being of metallic material in which it is not always desirable or possible to mold or cast the shank as an integral portion of one of the parts being assembled.

Figure 9:
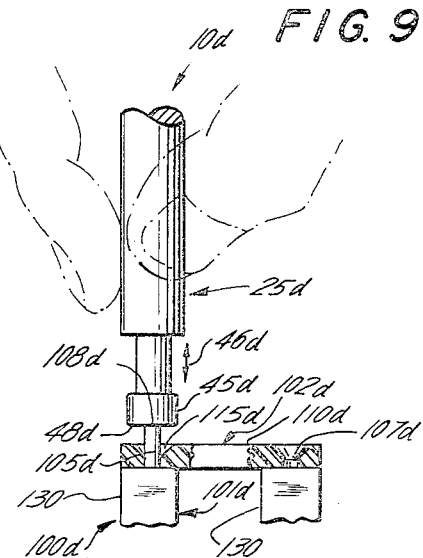
FIG. 9 is a view similar to that of FIG. 8 but illustrating the use of a hand held vibratory device for performing heading operations in accordance with the invention.

FIG. 9 illustrates another form 10d of the present invention, similar to that illustrated in FIG. 8, in which a hand-held vibratory instrument 25d is employed for practicing the methods of the present invention to obtain an assembly 100d. As shown in FIG. 9, the device for effecting the necessary high frequency vibrations of the tool 45d may be of the type disclosed fully in U.S. Letters Patent No. 3,076,904, assigned to the present assignee. For various assembly operations due to the size of the component parts as well as the cross-section area of the pronged portions, it is preferable to employ hand-held instruments for both commercial applications as well as home use. In the commercial applications there are those assembly operations in which an assembly worker must join the various components that are hidden from view and this requires the use of delicate instruments which can be hand held.

For home use it is highly desirable in the assembly of model plastic kits to avoid glue as well as heated sources such as soldering irons which often adversely affect the plastic parts and cause them to char or burn. With the use of hand-held instruments, it is possible to perform the heading operations of the present invention and as previously indicated, these are performed at reduced static forces wherein it is possible to secure together various component parts having thin, cross-sectional areas of even fragile materials.

As seen in FIG. 9 the first part 101d may, for example, be the hull of a model boat such as an aircraft carrier having side walls 130 and a series of prongs 105d extending therefrom. The second part 102d may be the flight deck of the model aircraft carrier provided with a series of apertures 115d, having a counter-sunk portion, through which the prongs extend. The output surface 48d of the tool 45d engages the face 108d of the prong 105d and gradually softens the material and under the continuing static force forms the headed portion 107d flat with the upper surface 110d of the second part 102d.

Figures 10, 11:
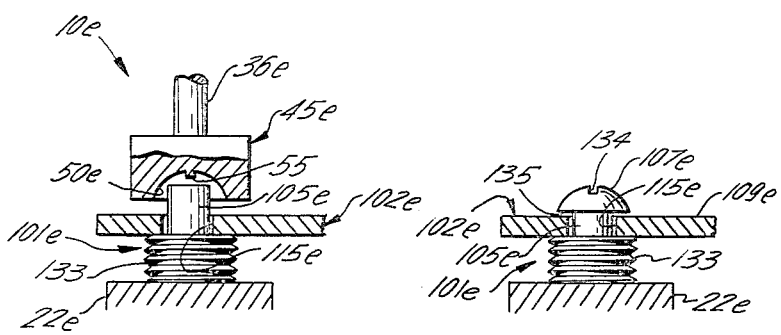
FIGS. 10 and 11 are views, partly in section, illustrating the fabrication of a captive fastener in accordance with the present invention.

FIGS. 10 and 11 illustrate another embodiment 10e of the present invention in which it is desirable to permanently secure a captive fastener to for example a cover plate as is often the case in industrial applications. By using the methods of the present invention, it is possible to form the head of such a fastener without altering the tolerances of the remaining portions thereof. For example, in prior art methods in which static forces had to be employed to form the head of such fasteners, the forces very often disrupted the tolerances in the threads, etc. thereof.

As seen in FIG. 10, the captive fastener which is the first part 101e of the assembly 10e is initially formed having a threaded body portion 133 with a circular shank or prong portion 105e extending from one end thereof. The second part 102e is provided with an aperture 115e which provides clearance for the receipt of the shank portion 105e therethrough.

Since the captive fastener 101e is required to have means for securing it to a third part (not shown), the tool 45e coupled to connecting body 36e is provided with a preformed recess 50e having a spherical cavity portion therein with a lip 55 at the upper surface thereof to form an indentation or slot 134 in the formed head 107e of the captive fastener. As the static force is applied and the tool 45e is simultaneously vibrated through its coupling with the connecting body 36e the headed portion 107e is formed with the slot 134 therein as seen in FIG. 11. By controlling the rate of application of the static forces and amplitude of vibration it is possible to retain the diameter of the shank portion substantially as it was prior to the application of said static forces so as to still permit a clearance between the shank 105e and the aperture 115e. A spacing between the lower surface of the headed portion 135 and the upper surface 109e of the second part 102e may also be provided by controlling the movement of the tool along the vertical axis of the captive fastener.

By employing high frequency vibratory energy in staking operations, in accordance with the methods herein, the applicants have found that a variety of materials may be headed over at greatly reduced static forces so that both more delicate and intricate configurations may be obtained in the formed head. Since the static force alone is not relied upon to accomplish the heading operation, it has been found that the tolerances of the finished head may be more accurately controlled to dimensional tolerances. The ability to soften material by employing acoustical energy also permits the staking of a greater variety of materials in which the prong may be of very small diameter which would crack under the static force required in the prior art methods.

Although illustrative embodiments of the invention have been described in detail herein with reference to the accompanying drawings, it is to be understood that the invention is not limited to those precise embodiments, and that various changes and modifications in addition to those mentioned above may be effected therein by one skilled in the art without departing from the scope or spirit of the invention, except as defined in the appended claims.

We claim:
1. The method of assembling together a first part in the form of a rivet-like member having an extended portion, and a second part, having an aperture designed to receive the extended portion of said first part, comprising the steps of
   (A) inserting the extended portion of said first part through said second part to position the parts in overlapping relationship to each other, the dimensional characteristics of said parts being such that said extended portion protrudes beyond the opposite side of said second part through which it is inserted,
   (B) supporting the first and second parts in said overlapping relationship to each other,
   (C) applying a static force to said first part in a direction substantially parallel to the axis of said extended portion, and
   (D) simultaneously applying high frequency mechanical vibrations to said rivet-like member of between approximately 1 kc./sec. and 100 kc./sec. and sufficient amplitude to cause said extended portion of said rivet-like member to soften to form a headed portion by the combined action of said vibrations and said static force, wherein the cross-sectional area of said headed portion is greater than the cross-sectional area of said aperture to assure a proper assembly of the two parts.

2. The method as in claim 1; wherein said high frequency mechanical vibrations are applied to the extended portion of said rivet-like member in a direction substantially parallel to the direction of said static force.

3. The method as in claim 1; wherein said mechanical vibrations are applied to a surface of said rivet-like member remote from said extended portion, and in a direction substantially parallel to the direction of said static force applied to said part.

4. The method as in claim 1; wherein said extended portion of said first member is made to pass through a third member before protruding beyond the opposite side of one of said members through which it is inserted and acts to secure said members together when headed over.

5. The method as in claim 1; further including the step of shaping the headed portion to a desired configuration.

6. The method as in claim 5; wherein said configuration is provided with a lip to form an indentation in said headed portion to receive an implement for angular rotation of said first part relative to said second part.

7. The method as in claim 1; wherein said second part is provided with a recess therein, and wherein the extended portion is displaced within said recess to form the headed portion.

8. The method as in claim 1; wherein said first part is in the form of a fastener having a threaded portion at one end thereof and having said extended portion protruding from its opposite end and through said second part, and wherein said extended portion is headed over to form a captive fastener.

9. The method as in claim 1; wherein said first part is in the form of a button, having prong-like members for the extended portion, and wherein said second part is in form as a fabric.

10. Apparatus for assembling together a first part and a second part, the first part being provided with an extended portion, comprising (A) means for supporting said first and second parts in overlapping relationship to each other, with said extended portion of said first part protruding beyond a surface of said second part, (B) a tool having an output surface, (C) means for exerting a static force urging the output surface of said tool against said first part, and (D) vibration generating means coupled to said tool to effect longitudinal vibration of the latter at a frequency between approximately 1 kc./sec. and 100 kc./sec. and sufficient amplitude to cause said extended portion of said first part protruding beyond the surface of said second part to soften and be headed over to form a headed portion by the combined action of said vibrations and said static force, whereby an assembly of said first and second parts is obtained.

References Cited

UNITED STATES PATENTS

| | | | |
|---|---|---|---|
| 3,158,928 | 12/1964 | De Prisco et al. | 29—470.1 |
| 3,224,915 | 12/1965 | Balamuth et al. | 29—470.1 X |
| 3,328,875 | 7/1967 | Pennings | 29—471.1 |
| 3,330,026 | 7/1967 | Best et al. | 29—470.1 |
| 3,360,849 | 1/1968 | Forman et al. | 29—470.1 |
| 3,367,809 | 2/1968 | Soloff | 228—1 X |
| 2,935,434 | 5/1960 | Dawson | 29—433 X |
| 2,470,963 | 5/1949 | Weyl. | |
| 2,510,693 | 6/1950 | Green. | |
| 3,001,279 | 9/1961 | Sherrill. | |
| 3,022,814 | 2/1962 | Bodine | 156—73 |
| 3,184,354 | 5/1965 | Strother | 156—73 |
| 3,224,916 | 12/1965 | Soloff et al. | 156—73 |

JOHN F. CAMPBELL, Primary Examiner

D. C. REILEY, Assistant Examiner

U.S. Cl. X.R.

29—243.54; 156—73; 228—1